(12) United States Patent
Akatsuka et al.

(10) Patent No.: US 12,172,721 B2
(45) Date of Patent: Dec. 24, 2024

(54) VEHICLE CONTROL SYSTEM AND VEHICLE CONTROL METHOD

(71) Applicants: TOYOTA JIDOSHA KABUSHIKI KAISHA, Toyota (JP); JTEKT CORPORATION, Kariya (JP)

(72) Inventors: Kosuke Akatsuka, Mishima (JP); Yoshio Kudo, Machida (JP); Junya Miyake, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 169 days.

(21) Appl. No.: 17/735,195

(22) Filed: May 3, 2022

(65) Prior Publication Data

US 2022/0410968 A1    Dec. 29, 2022

(30) Foreign Application Priority Data

Jun. 28, 2021   (JP) ................................. 2021-106869

(51) Int. Cl.
*A61M 37/00*   (2006.01)
*A61B 5/00*   (2006.01)
*B62D 5/04*   (2006.01)
*B62D 6/00*   (2006.01)
*B62D 15/02*   (2006.01)
*C12N 15/115*   (2010.01)
*G01N 33/543*   (2006.01)

(52) U.S. Cl.
CPC ........... *B62D 6/008* (2013.01); *B62D 5/0481* (2013.01); *B62D 15/0215* (2013.01)

(58) Field of Classification Search
None
See application file for complete search history.

(56) References Cited

U.S. PATENT DOCUMENTS

2019/0092383 A1\*   3/2019   Kodera ................. B62D 6/002

FOREIGN PATENT DOCUMENTS

JP           5781791 B2     9/2015

\* cited by examiner

*Primary Examiner* — Jonathan M Dager
*Assistant Examiner* — Laura E Linhardt
(74) *Attorney, Agent, or Firm* — Sughrue Mion, PLLC

(57) ABSTRACT

A vehicle control system for a steer-by-wire vehicle executes: driving assist control that assists driving of the vehicle; and conjunction reaction force control that applies a steering reaction force component to a steering wheel in conjunction with vehicle turning caused by the driving assist control. A driver turn angle is a target turn angle corresponding to a steering angle of the steering wheel, and a first system turn angle is a target turn angle required by the driving assist control. In the conjunction reaction force control, a second system turn angle is acquired by adjusting the first system turn angle according to a driver's steering intention such that the difference between the system turn angle and the driver turn angle becomes smaller. Then, a steering reaction force component is applied in a direction of reducing a difference between the driver turn angle and the second system turn angle.

6 Claims, 13 Drawing Sheets

VEHICLE CONTROL SYSTEM AND VEHICLE CONTROL METHOD

CROSS-REFERENCE TO RELATED APPLICATION

The present disclosure claims priority to Japanese Patent Application No. 2021-106869, filed on Jun. 28, 2021, the contents of which application are incorporated herein by reference in there entirety.

BACKGROUND

Technical Field

The present disclosure relates to a technique of controlling a vehicle of a steer-by-wire (SBW) type. In particular, the present disclosure relates to a technique of controlling a vehicle of a steer-by-wire type having a function of driving assist control for assisting driving of the vehicle.

Background Art

Patent Literature 1 discloses a driving assist device that assists driving of a vehicle. When detecting an obstacle around the vehicle, the driving assist device determines a braking control amount for avoiding collision based on possibility of collision with the obstacle. Here, when a driver of the vehicle performs a steering operation in a direction away from the obstacle, the driving assist device corrects the braking control amount to be smaller.

LIST OF RELATED ART

Patent Literature 1: Japanese Patent No. 5781791

SUMMARY

A case where a vehicle of a steer-by-wire type has a function of driving assist control that assists driving of the vehicle is considered. For example, the driving assist control automatically turns (steers) the vehicle independently of a steering operation by a driver. Meanwhile, reaction force control that applies a steering reaction force to a steering wheel is performed in the case of the vehicle of the steer-by-wire type. The reaction force control may be performed in conjunction with the vehicle turning caused by the driving assist control. Depending on conditions, the driver may have a feeling of strangeness about the reaction force control performed in conjunction with the vehicle turning caused by the driving assist control.

An object of the present disclosure is to provide a technique that can reduce the driver's feeling of strangeness about the reaction force control performed in conjunction with the vehicle turning caused by the driving assist control, in the vehicle of the steer-by-wire type.

A first aspect is directed to a vehicle control system that controls a vehicle of a steer-by-wire type.

The vehicle control system includes one or more processors.

The one or more processors are configured to execute:
driving assist control that assists driving of the vehicle; and
conjunction reaction force control that applies a steering reaction force component to a steering wheel in conjunction with turning of the vehicle caused by the driving assist control.

The conjunction reaction force control includes:
a process of acquiring a driver turn angle that is a target turn angle corresponding to a steering angle of the steering wheel;
a process of acquiring a first system turn angle that is a target turn angle required by the driving assist control;
an adjustment process that acquires a second system turn angle by adjusting the first system turn angle according to a steering intention of a driver of the vehicle; and
a process of applying a steering reaction force component to the steering wheel in a direction of reducing a difference between the driver turn angle and the second system turn angle.

The adjustment process acquires the second system turn angle by adjusting the first system turn angle such that the difference between the second system turn angle and the driver turn angle becomes smaller than a difference between the first system turn angle and the driver turn angle.

A second aspect is directed to a vehicle control method that controls a vehicle of a steer-by-wire type.

The vehicle control method includes:
driving assist control that assists driving of the vehicle; and
conjunction reaction force control that applies a steering reaction force component to a steering wheel in conjunction with turning of the vehicle caused by the driving assist control, The conjunction reaction force control includes:
a process of acquiring a driver turn angle that is a target turn angle corresponding to a steering angle of the steering wheel;
a process of acquiring a first system turn angle that is a target turn angle required by the driving assist control;
an adjustment process that acquires a second system turn angle by adjusting the first system turn angle according to a steering intention of a driver of the vehicle; and
a process of applying a steering reaction force component to the steering wheel in a direction of reducing a difference between the driver turn angle and the second system turn angle.

The adjustment process acquires the second system turn angle by adjusting the first system turn angle such that the difference between the second system turn angle and the driver turn angle becomes smaller than a difference between the first system turn angle and the driver turn angle.

According to the present disclosure, the conjunction reaction force control that applies the steering reaction force component to the steering wheel in conjunction with the vehicle turning caused by the driving assist control is performed. The steering reaction force component for the conjunction reaction force control is generated based on the difference between the driver turn angle and the system turn angle. At this time, the adjustment of the system turn angle is performed according to the steering intention of the driver. Then, the steering reaction force component for the conjunction reaction force control is generated by using the second system turn angle after the adjustment instead of the first system turn angle before the adjustment. The difference between the second system turn angle after the adjustment and the driver turn angle becomes smaller than the difference between the first system turn angle before the adjustment and the driver turn angle. Therefore, when the driver has the steering intention, the steering reaction force component for the conjunction reaction force control is suppressed. As a result, the driver's feeling of strangeness about the conjunction reaction force control is reduced.

EMBODIMENTS

Embodiments of the present disclosure will be described below with reference to the attached drawings.

1. Vehicle Control System

Figure 1:
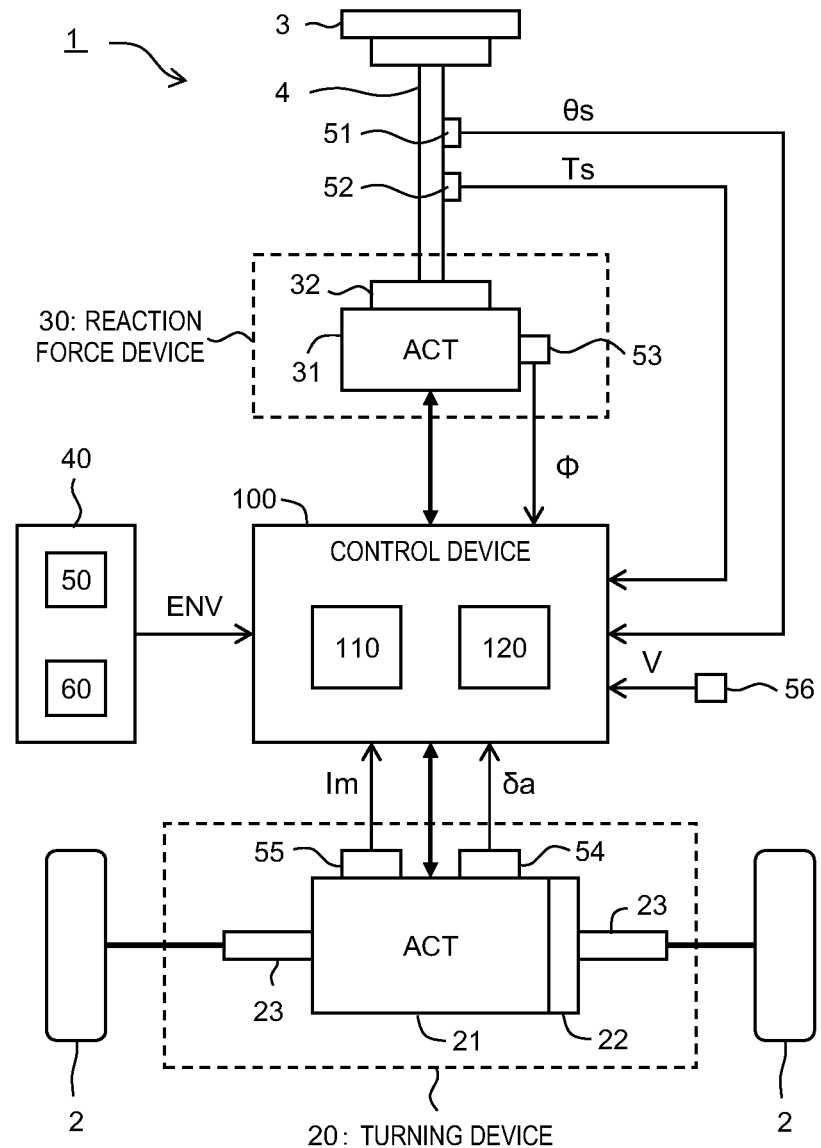
FIG. 1 is a schematic diagram showing a configuration example of a vehicle and a vehicle control system according to an embodiment.

FIG. 1 is a schematic diagram showing a configuration example of a vehicle 1 and a vehicle control system 10 according to the present embodiment. The vehicle 1 is provided with a wheel 2 and a steering wheel 3. The steering wheel 3 is an operation member that a driver of the vehicle 1 uses for a steering operation. A steering shaft 4 is coupled with the steering wheel 3 and rotates together with the steering wheel 3. The vehicle 1 is a vehicle of a steer-by-wire type, and the wheel 2 and the steering wheel 3 are mechanically disconnected from each other.

The vehicle control system 10 controls the vehicle 1 of the steer-by-wire type. The vehicle control system 10 includes a turning device 20, a reaction force device 30, a driving environment information acquisition device 40, and a control device 100.

The turning device 20 turns the wheel 2. Here, turning the wheel 2 means changing a direction of the wheel 2 for making a turn. The turning device 20 includes a turning actuator 21 for turning the wheel 2. For example, the turning actuator 21 is a turning motor. A rotor or the turning motor is connected to a turning bar 23 through a speed reducer 22. The turning bar 23 is coupled with the wheel 2. When the turning motor rotates, its rotational motion is converted into a linear motion of the turning bar 23, and thereby the wheel 2 turns (i.e. changes its direction). That is, actuating the turning motor makes it possible to turn the wheel 2. The operation of the turning actuator 21 is controlled by the control device 100.

The reaction force device 30 applies a steering reaction force (reaction torque) to the steering wheel 3. The reaction force device 30 includes a reaction force actuator 31 for applying the steering reaction force to the steering wheel 3. For example, the reaction force actuator 31 is a reaction force motor. Actuating the reaction force motor makes it possible to apply the steering reaction force to the steering shaft 4 and thus to the steering wheel 3. The operation of the reaction force actuator 31 is controlled by the control device 100.

The driving environment information acquisition device 40 acquires driving environment information ENV indicating a driving environment for the vehicle 1. The driving environment information acquisition device 40 includes a vehicle state sensor 50, a recognition sensor 60, and the like.

The vehicle state sensor 50 detects a state of the vehicle 1. The vehicle state sensor 50 includes a steering angle sensor 51, a steering torque sensor 52, a rotational angle sensor 53, a rotational angle sensor 54, a turning current sensor 55, a vehicle speed sensor 56, and the like. The steering angle sensor 51 detects a steering angle $\theta s$ (i.e., a steering wheel angle) of the steering wheel 3. The steering torque sensor 52 detects a steering torque Ts applied to the steering shaft 4. The rotational angle sensor 53 detects a rotation angle $\Phi$ of the reaction force actuator 31 (e.g., the reaction force motor). The rotational angle sensor 54 detects a rotation angle of the turning actuator 21 (e.g., the turning motor). The rotation angle of the turning motor corresponds to a turn angle (i.e., an actual turn angle $\delta a$) of the wheel 2. It can be also said that the rotational angle sensor 54 detects the actual turn angle $\delta a$ of the wheel 2. The turning current sensor 55 detects a turning current Im that drives the turning actuator 21. The vehicle speed sensor 56 detects a vehicle speed V being a speed of the vehicle 1. In addition, the vehicle state sensor 50 may include a yaw rate sensor and an acceleration sensor.

The recognition sensor 60 recognizes (detects) a situation around the vehicle 1. Examples of the recognition sensor 60 include a camera, a LIDAR (Laser Imaging Detection and Ranging), a radar, and the like.

The driving environment information acquisition device 40 may further include a position sensor that acquires a position of the vehicle 1. The position sensor is exemplified by a GPS (Global Positioning System) sensor. The driving environment information acquisition device 40 may acquire map information.

The driving environment information ENV includes vehicle state information and surrounding situation information. The vehicle state information indicates the vehicle state detected by the vehicle state sensor 50. The surrounding situation information indicates results of recognition by the recognition sensor 60. For example, the surrounding situation information includes an image captured by the camera. The surrounding situation information may include object information about objects around the vehicle 1. Examples of the objects around the vehicle 1 include a pedestrian, another vehicle (e.g., a preceding vehicle, a parked vehicle, etc.), a sign, a white line, a roadside structure, and the like. The object information indicates a relative position and a relative velocity of the object with respect to the vehicle 1. The driving environment information ENV may further include the position information of the vehicle 1, the map information, and the like.

The control device (controller) 100 controls the vehicle 1. The control device 100 includes one or more processors 110 (hereinafter simply referred to as a processor 110) and one or more memory devices 120 (hereinafter simply referred to as a memory devices 120). The processor 110 executes a variety of processing. For example, the processor 110 includes a CPU (Central Processing Unit). The memory device (memory) 120 stores a variety of information necessary for the processing by the processor 110. Examples of the memory device 120 include a volatile memory, a non-volatile memory, an HDD (Hard Disk Drive), an SSD (Solid State Drive), and the like. The control device 100 may include one or more ECUs (Electronic Control Units).

The variety of processing by the control device 100 is implemented by the processor 110 executing a control program being a computer program. The control program is stored in the memory device 120. As another example, the control program may be recorded on a non-transitory computer-readable recording medium.

The control device 100 (i.e., the processor 110) acquires the driving environment information ENV from the driving environment information acquisition device 40. The driving environment information ENV is stored in the memory device 120.

Figure 2:
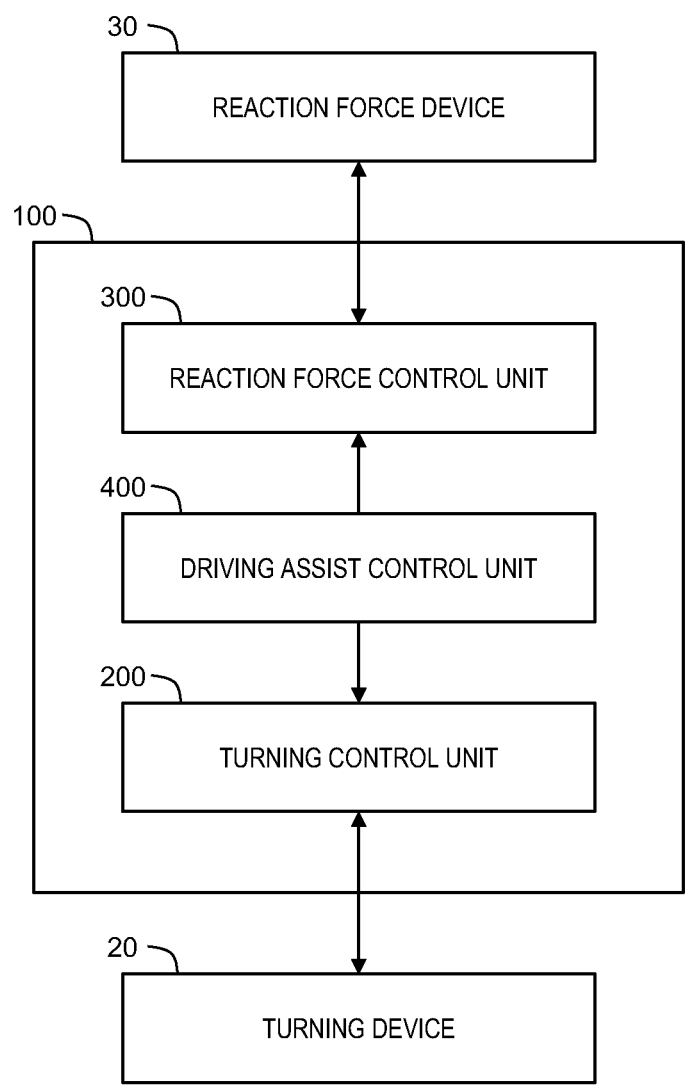
FIG. 2 is a block diagram showing a functional configuration of a control device of a vehicle control system according to an embodiment.

FIG. 2 is a block diagram showing a functional configuration of the control device 100. The control device 100 includes a turning control unit 200, a reaction force control unit 300, and a driving assist control unit 400 as functional blocks. These functional blocks are realized by a cooperation of the processor 110 executing the control program and the memory device 120. It should be noted that the turning control unit 200, the reaction force control unit 300, and the driving assist control unit 400 may be realized by different control devices, respectively. In that case, the control devices are communicably connected to each other and communicate necessary information with each other.

Hereinafter, each of the turning control unit 200, the reaction force control unit 300, and the driving assist control unit 400 will be described in more detail.

2. Turning Control

The turning control unit 200 executes "turning control" that turns the wheel 2. More specifically, the turning control unit 200 turns (i.e., changes a direction of) the wheel 2 by controlling the turning actuator 21 of the turning device 20.

The turning control unit 200 executes the turning control in response to a steering operation of the steering wheel 3 performed by the driver. For example, the turning control unit 200 calculates a target turn angle δt based on the steering angle θs and the vehicle speed V. The steering angle θs is detected by the steering angle sensor 51. As another example, the steering angle θs may be calculated from the rotation angle Φ detected by the rotational angle sensor 53. The vehicle speed V is detected by the vehicle speed sensor 56. The turning control unit 200 turns the wheel 2 according to the target turn angle δt. The actual turn angle δa of the wheel 2 is detected by the rotational angle sensor 54. The turning control unit 200 controls the turning actuator 21 such that the actual turn angle δa follows the target turn angle δt. More specifically, the turning control unit 200 generates a control signal for driving the turning actuator 21 based on a deviation between the target turn angle δt and the actual turn angle δa of the wheel 2. The turning actuator 21 is driven according to the control signal, and thereby the wheel 2 is turned. It should be noted a current driving the turning actuator 21 at this time is the turning current Im.

Moreover, the turning control unit 200 executes the turning control according to a request from the driving assist control unit 400 described later. In this case, the turning control unit 200 acquires a target control amount from the driving assist control unit 400 and executes the turning control according to the target control amount.

3. Reaction Force Control

The reaction force control unit 300 executes "reaction force control" that applies the steering reaction force (reaction torque) to the steering wheel 3. More specifically, the reaction force control unit 300 applies the steering reaction force to the steering wheel 3 by controlling the reaction force actuator 31 of the reaction force device 30.

The reaction force control unit 300 executes the reaction force control in response to the steering operation of the steering wheel 3 performed by the driver. For example, the reaction force control unit 300 calculates a target steering reaction force (spring component) corresponding to a self-aligning torque applied to the wheel 2, based on the steering angle θs and the vehicle speed V. The target steering reaction force may further include a damping component according to a steering speed (dθs/dt). The reaction force control unit 300 controls the reaction force actuator 31 so as to generate the target steering reaction force. More specifically, the reaction force control unit 300 generates a control signal for driving the reaction force actuator 31 based on the target steering reaction force. The reaction force actuator 31 is driven according to the control signal, and thereby the steering reaction force is generated.

Moreover, the reaction force control unit 300 may execute the reaction force control according to a request from the driving assist control unit 400 described later. Furthermore, the reaction force control unit 300 may execute the reaction force control in conjunction (collaboration) with the driving assist control by the driving assist control unit 400. Details of the reaction force control performed in conjunction with the driving assist control will be described later.

4. Driving Assist Control

The driving assist control unit 400 executes "driving assist control" that assists driving of the vehicle 1. The driving assist control automatically controls travel of the vehicle 1 independently of a driving operation by the driver. In the present embodiment, the driving assist control related to steering will be considered in particular. Examples of such the driving assist control include automated driving control, risk avoidance control, lane keep assist control (LTA: Lane Tracing Assist), lane departure suppression control (LDA: Lane Departure Alert), and the like.

The automated driving control controls automated driving of the vehicle 1. More specifically, the driving assist control unit 400 generates a travel plan of the vehicle 1 based on the driving environment information ENV. Examples of the travel plan include keeping a current travel lane, making a lane change, making a right or left turn, avoiding an obstacle, and the like. Furthermore, the driving assist control unit 400 generates a target trajectory TRJ necessary for the vehicle 1 to travel in accordance with the travel plan, based on the driving environment information ENV. The target trajectory TRJ includes a target position and a target speed.

Then, the driving assist control unit 400 performs vehicle travel control such that the vehicle 1 follows the target trajectory TRJ.

More specifically, the driving assist control unit 400 calculates a deviation (e.g., a lateral deviation, a yaw angle deviation, and a speed deviation) between the vehicle 1 and the target trajectory TRJ, and calculates a target control amount necessary for reducing the deviation. Examples of the target control amount include a target turn angle, a target yaw rate, a target speed, a target acceleration, a target deceleration, a target current, and the like. The driving assist control unit 400 performs the vehicle travel control according to the target control amount. The vehicle travel control includes turning control, acceleration control, and deceleration control. The turning control is performed through the turning control unit 200 described above. The acceleration control and the deceleration control are performed by controlling a driving device and a braking device (not shown) of the vehicle 1.

Figure 3:
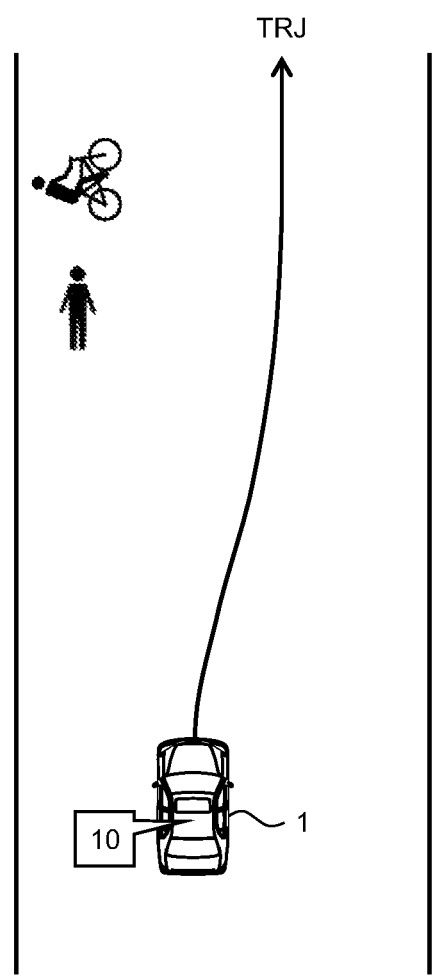
FIG. 3 is a conceptual diagram for explaining risk avoidance control being an example of driving assist control.

FIG. 3 is a conceptual diagram for explaining the risk avoidance control. The risk avoidance control is the driving assist control for reducing a risk of collision with an object existing ahead of the vehicle 1. Examples of the object as the avoidance target include a pedestrian, a bicycle, a motorcycle, an animal, another vehicle, and the like. The driving assist control unit 400 recognizes the object existing ahead of the vehicle 1 based on the surrounding situation information (object information) included in the driving environment information ENV. For example, when the risk of collision with the recognized object exceeds a threshold, the driving assist control unit 400 executes the risk avoidance control. More specifically, the driving assist control unit 400 generates a target trajectory TRJ moving in a direction away from the object in order to secure a lateral distance to the object. Then, the driving assist control unit 400 performs the vehicle travel control such that the vehicle 1 follows the target trajectory TRJ. The vehicle travel control here includes at least one of the turning control and the deceleration control. The turning control is performed through the turning control unit 200 described above.

Figure 4:
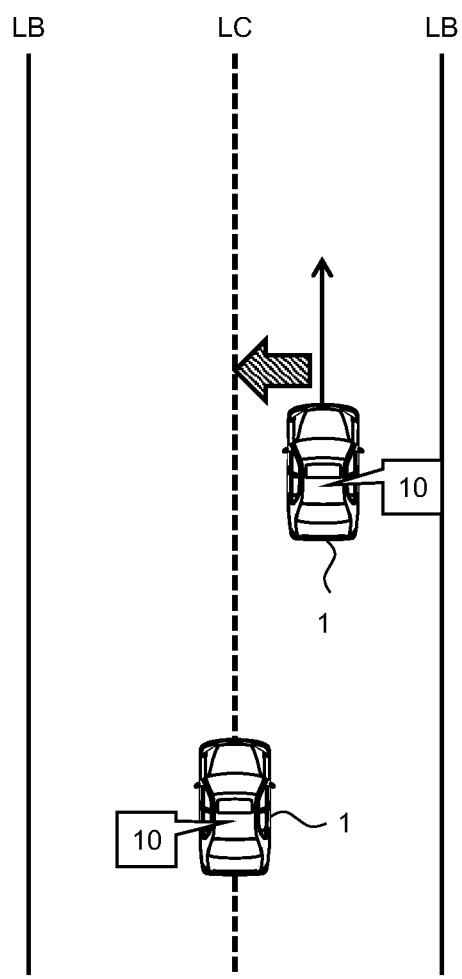
FIG. 4 is a conceptual diagram for explaining lane keep assist control being another example of driving assist control.

FIG. 4 is a conceptual diagram for explaining the lane keep assist control. The lane keep assist control is the driving assist control for assisting the vehicle 1 to travel along a lane center LC. The lane is an area sandwiched between left and right lane boundaries LB. Examples of the lane boundary LB include a white line (lane marking), a curb, and the like. The lane center LC is a center line of the lane. The driving assist control unit 400 recognizes the lane boundary LB and the lane center LC based on the surrounding situation information included in the driving environment information ENV. When the vehicle 1 deviates from the lane center LC, the driving assist control unit 400 executes the lane keep assist control. More specifically, the driving assist control unit 400 executes the turning control such that the vehicle 1 returns back to the lane center LC. The turning control is performed through the turning control unit 200 described above.

Figure 5:
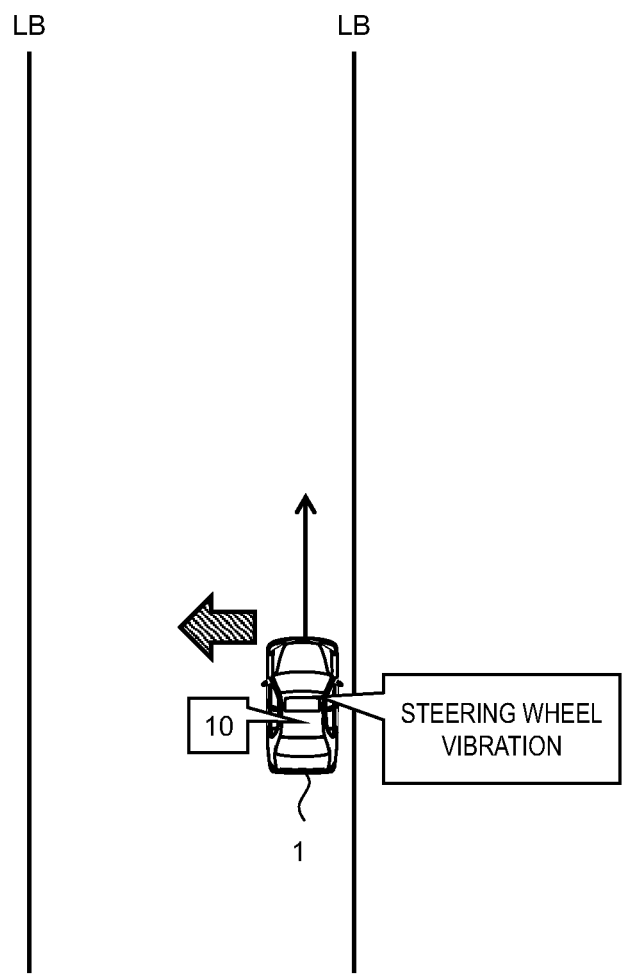
FIG. 5 is a conceptual diagram for explaining lane departure suppression control being yet another example of driving assist control.

FIG. 5 is a conceptual diagram for explaining the lane departure suppression control. The lane departure suppression control is the driving assist control for suppressing the vehicle 1 from departing from a travel lane. The driving assist control unit 400 recognizes the lane boundary LB based on the surrounding situation information included in the driving environment information ENV. When a distance between the vehicle 1 and the lane boundary LB becomes less than a predetermined threshold, the driving assist control unit 400 executes the lane departure suppression control. More specifically, the driving assist control unit 400 notifies the driver of a possibility of the lane departure. For example, the driving assist control unit 400 vibrates the steering wheel 3 by controlling a steering wheel vibration mechanism (not shown). The driving assist control unit 400 may output an alert through display and/or audio. Moreover, the driving assist control unit 400 may execute the turning control such that the vehicle 1 moves toward the lane center LC. The turning control is performed through the turning control unit 200 described above.

5. Cooperation of Driving Assist Control and Reaction Force Control

Next, cooperation of the driving assist control and the reaction force control will be considered. For example, a case where the reaction force control is performed in conjunction (collaboration) with turning of the vehicle 1 caused by the driving assist control will be considered. Such the reaction force control performed in conjunction with turning of the vehicle 1 caused by the driving assist control is hereinafter referred to as "conjunction reaction force control."

5-1. Outline of Conjunction Reaction Force Control

The conjunction reaction force control is intended to move (rotate) the steering wheel 3 in conjunction with the turning of the vehicle 1 (i.e., changing a direction of the wheel 2) caused by the driving assist control when the driving assist control is in operation. For that purpose, the conjunction reaction force control applies a steering reaction force component for making the steering wheel 3 follow the turning of the vehicle 1 caused by the driving assist control to the steering wheel 3.

Figure 6:
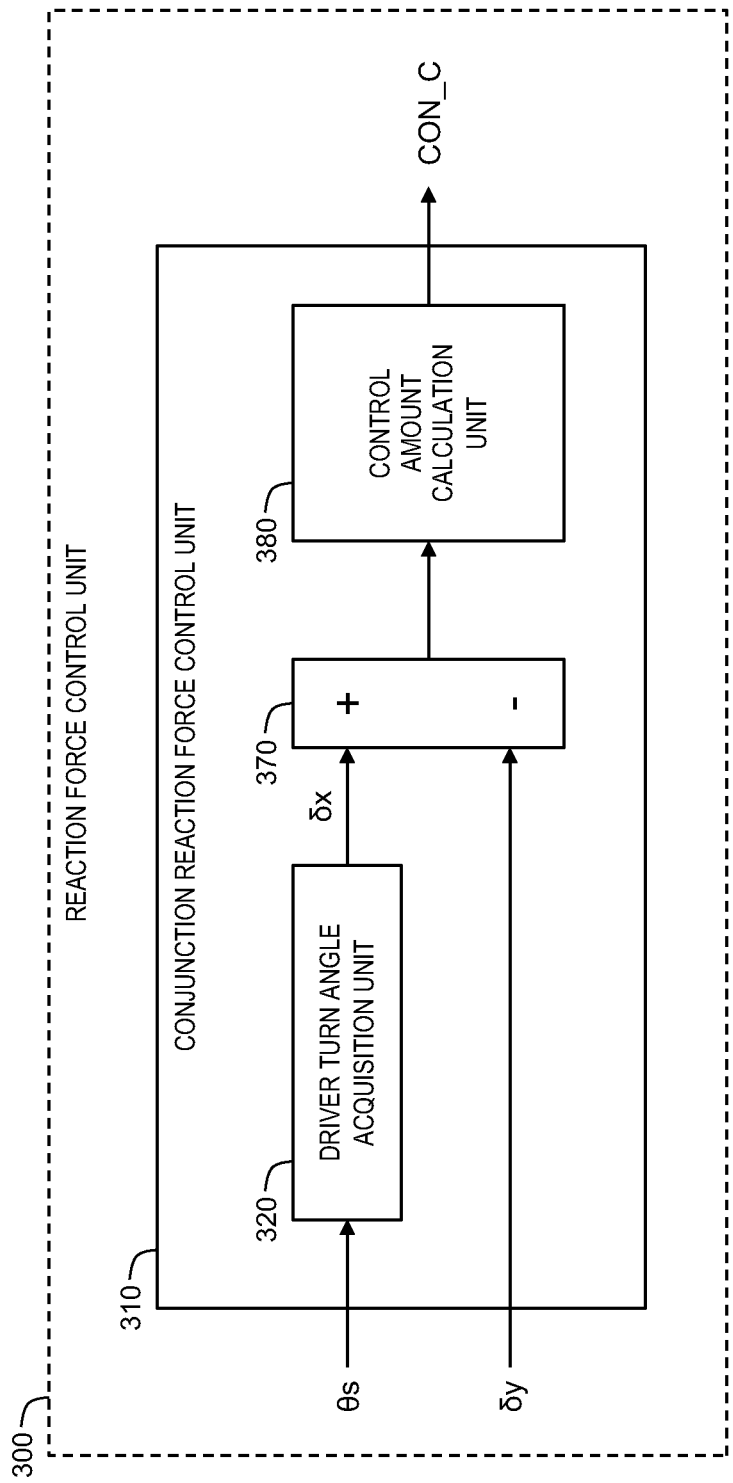
FIG. 6 is a block diagram showing a conjunction reaction force control unit according to a comparative example.

First, a comparative example will be explained with reference to FIG. 6. The reaction force control unit 300 includes a conjunction reaction force control unit 310. The conjunction reaction force control unit 310 calculates a target control amount CON_C for generating the steering reaction force component for the conjunction reaction force control. The conjunction reaction force control unit 310 includes a driver turn angle acquisition unit 320, a difference calculation unit 370, and a control amount calculation unit 380.

The driver turn angle acquisition unit 320 acquires the steering angle θs (i.e., the steering wheel angle) of the steering wheel 3 included in the vehicle state information. Further, the driver turn angle acquisition unit 320 calculates a target turn angle δt corresponding to the steering angle θs of the steering wheel 3 based on a variable gear ratio and the like. The calculation of the target turn angle δt is the same as that by the turning control unit 200 described above. For convenience sake, the target turn angle δt corresponding to the steering angle θs of the steering wheel 3 is hereinafter referred to as a "driver turn angle δx."

On the other hand, a "system turn angle δy" is a target turn angle δt required by the driving assist control. As described above, the system turn angle δy is determined by the driving assist control unit 400. The conjunction reaction force control unit 310 acquires the system turn angle δy determined by the driving assist control unit 400.

The difference calculation unit 370 calculates a difference (deviation) between the driver turn angle δx and the system turn angle δy.

The control amount calculation unit 380 calculates the target control amount CON_C for generating a steering reaction force component in a direction of reducing the difference between the driver turn angle δx and the system turn angle δy. For example, the control amount calculation unit 380 calculates the target control amount CON_C such that the steering reaction force component increases as the difference becomes larger.

It should be noted that the reaction force control unit 300 calculates a final target control amount by combining the target control amount CON_C caused by the conjunction reaction force control and another target control amount caused by another type of reaction force control. Then, the reaction force control unit 300 executes the reaction force control by controlling the reaction force actuator 31 of the reaction force device 30 in accordance with the final target control amount.

As described above, the conjunction reaction force control calculates the difference between the driver turn angle δx and the system turn angle δy, and applies the steering reaction force component in a direction of reducing the difference to the steering wheel 3. However, depending on conditions, the driver may have a feeling of strangeness about such the conjunction reaction force control. For example, when the driver has a positive steering intention, the conjunction reaction force control may cause the driver to feel that the steering wheel 3 is heavy. As another example, the conjunction reaction force control may cause the driver to feel that the steering wheel 3 is strongly returned back.

In view of the above, the present embodiment proposes a technique that can reduce the driver's feeling of strangeness about the conjunction reaction force control.

Figure 7:
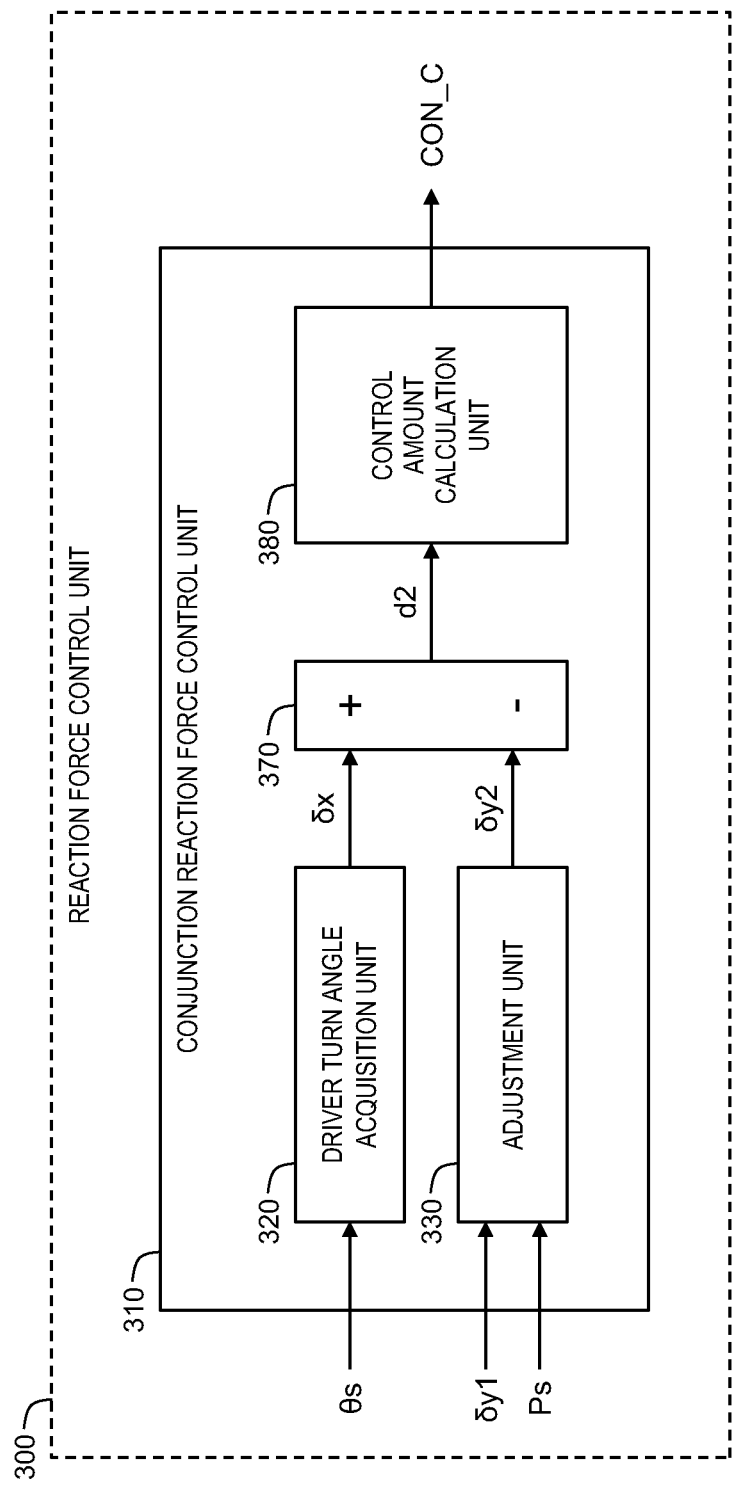
FIG. 7 is a block diagram showing a conjunction reaction force control unit according to an embodiment.

FIG. 7 is a block diagram showing the conjunction reaction force control unit 310 according to the present embodiment. As compared with the case of the comparative example shown in FIG. 6, the conjunction reaction force control unit 310 further includes an adjustment unit 330.

The adjustment unit 330 executes an "adjustment process" that adjusts the system turn angle δy. For convenience sake, the system turn angle δy required by the driving assist control, that is, the system turn angle δy determined by the driving assist control unit 400 is hereinafter referred to as a "first system turn angle δy1." The adjustment unit 330 acquires the first system turn angle δy1 and adjusts the first system turn angle δy1 according to a steering intention of the driver. The system turn angle δy after the adjustment is hereinafter referred to as a "second system turn angle δy2." That is, the adjustment unit 330 acquires the second system turn angle δy2 by adjusting the first system turn angle δy1 according to the driver's steering intention.

The driver's steering intention is reflected in a steering parameter Ps. For example, the steering parameter Ps is the driver turn angle δx. As another example, the steering parameter Ps may be a difference between the driver turn angle δx and the first system turn angle δy1. As still another example, the steering parameter Ps may be the steering torque Ts detected by the steering torque sensor 52. The adjustment unit 330 acquires the second system turn angle δy2 by adjusting the first system turn angle δy1 according to the steering parameter Ps.

A relationship between the first system turn angle δy1 and the second system turn angle δy2 is as follows. A first difference d1 is a difference (deviation) between the first system turn angle δy1 before the adjustment and the driver turn angle δx. On the other hand, a second difference d2 is a difference (deviation) between the second system turn angle δy2 after the adjustment and the driver turn angle δx. The adjustment unit 330 acquires the second system turn angle δy2 by adjusting the first system turn angle δy1 such that an absolute value of the second difference d2 becomes smaller than an absolute value of the first difference d1.

After that, the difference calculation unit 370 calculates the second difference d2 between the driver turn angle δx and the second system turn angle δy2. Then, the control amount calculation unit 380 calculates a target control amount CON_C for generating a steering reaction force component in a direction of reducing the second difference d2. For example, the control amount calculation unit 380 calculates the target control amount CON_C such that the steering reaction force component increases as the second difference d2 becomes larger.

As described above, in the conjunction reaction force control according to the present embodiment, the adjustment of the system turn angle δy is performed according to the steering intention of the driver. Then, the steering reaction force component for the conjunction reaction force control is generated by using the second system turn angle δy2 after the adjustment instead of the first system turn angle δy1 before the adjustment. The second difference d2 between the second system turn angle δy2 after the adjustment and the driver turn angle δx becomes smaller than the first difference d1 between the first system turn angle δy1 before the adjustment and the driver turn angle δx. Therefore, when the driver has the steering intention, the steering reaction force component for the conjunction reaction force control is suppressed. As a result, the driver's feeling of strangeness about the conjunction reaction force control is reduced.

It should be noted that the adjustment of the system turn angle δy is performed only in the conjunction reaction force control for applying the steering reaction force to the steering wheel 3. The driving assist control unit 400 performs the driving assist control including the turning control based on the system turn angle δy determined by itself (i.e., the first system turn angle δy1). Therefore, in the driving assist control, the vehicle turning is achieved as intended. That is to say, performance of the driving assist control is never deteriorated.

5-2. Configuration Examples of Adjustment Unit

Figure 8:
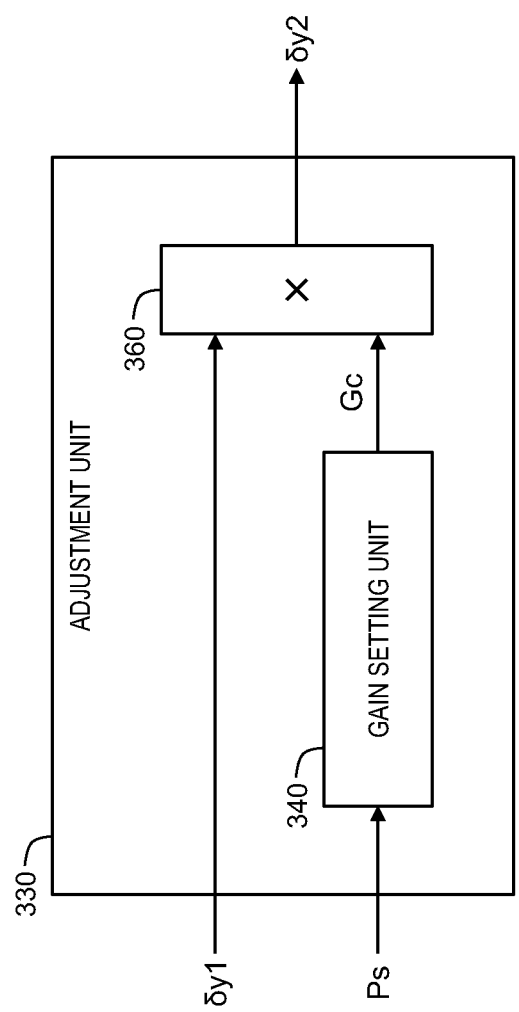
FIG. 8 is a block diagram showing a configuration example of an adjustment unit of a conjunction reaction force control unit according to an embodiment.

FIG. 8 is a block diagram showing a configuration example of the adjustment unit 330 of the conjunction reaction force control unit 310. The adjustment unit 330 includes a gain setting unit 340 and a multiplier unit 360. The gain setting unit 340 executes a "gain setting process" that sets a conjunction reaction force gain Gc. The gain setting unit 340 sets the conjunction reaction force gain Gc according to the driver's steering intention, that is, the steering parameter Ps. Then, the multiplier unit 360 calculates the second system turn angle δy2 by multiplying the first system turn angle δy1 by the conjunction reaction force gain Gc (i.e., δy2=Gc×δy1).

The gain setting unit 340 sets the conjunction reaction force gain Gc such that the second difference d2 between the second system turn angle δy2 and the driver turn angle δx becomes smaller than the first difference d1 between the first system turn angle δy1 and the driver turn angle δx. Hereinafter, various configuration examples of the gain setting unit 340 will be described.

5-2-1. First Configuration Example

Figure 9:
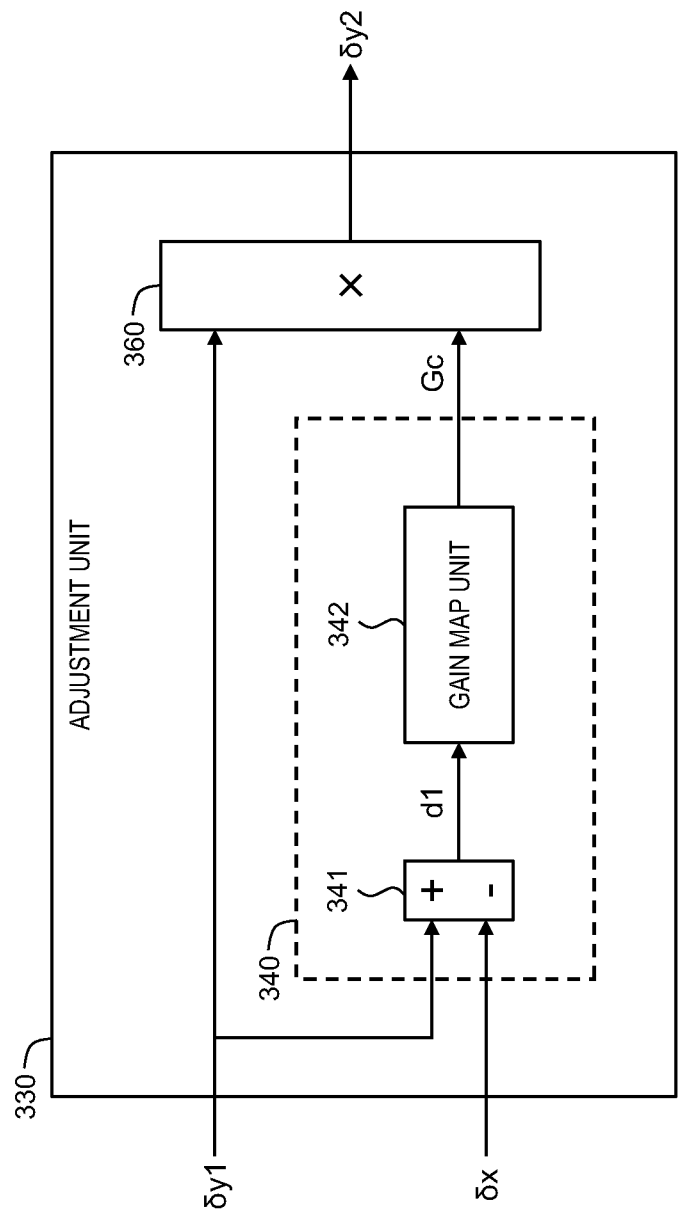
FIG. 9 is a block diagram showing a first configuration example of a gain setting unit according to an embodiment.

FIG. 9 is a block diagram showing a first configuration example of the gain setting unit 340. The gain setting unit 340 includes a difference calculation unit 341 and a gain map unit 342.

The difference calculation unit 341 calculates the first difference d1 between the first system turn angle δy1 and the driver turn angle δx. It should be noted that in the first configuration example, the driver turn angle δx or the first difference d1 between the first system turn angle δy1 and the driver turn angle δx corresponds to the steering parameter Ps.

The gain map unit 342 sets the conjunction reaction force gain Gc based on the first difference d1. For example, when the driver turn angle δx is larger than the first system turn angle δy1, the conjunction reaction force gain Gc is set to a value larger than 1 in order to make the second system turn angle δy2 be more closer to the driver turn angle δx. On the other hand, when the first system turn angle δy1 is larger than the driver turn angle δx, the conjunction reaction force gain Gc is set to a value smaller than 1 in order to make the second system turn angle δy2 be more closer to the driver turn angle δx. As a result, the second difference d2 between the second system turn angle δy2 and the driver turn angle δx becomes smaller than the first difference d1 between the first system turn angle δy1 and the driver turn angle δx.

The gain map unit 342 may set the conjunction reaction force gain Gc in consideration of the vehicle speed V together with the first difference d1.

5-2-2. Second Configuration Example

Figure 10:
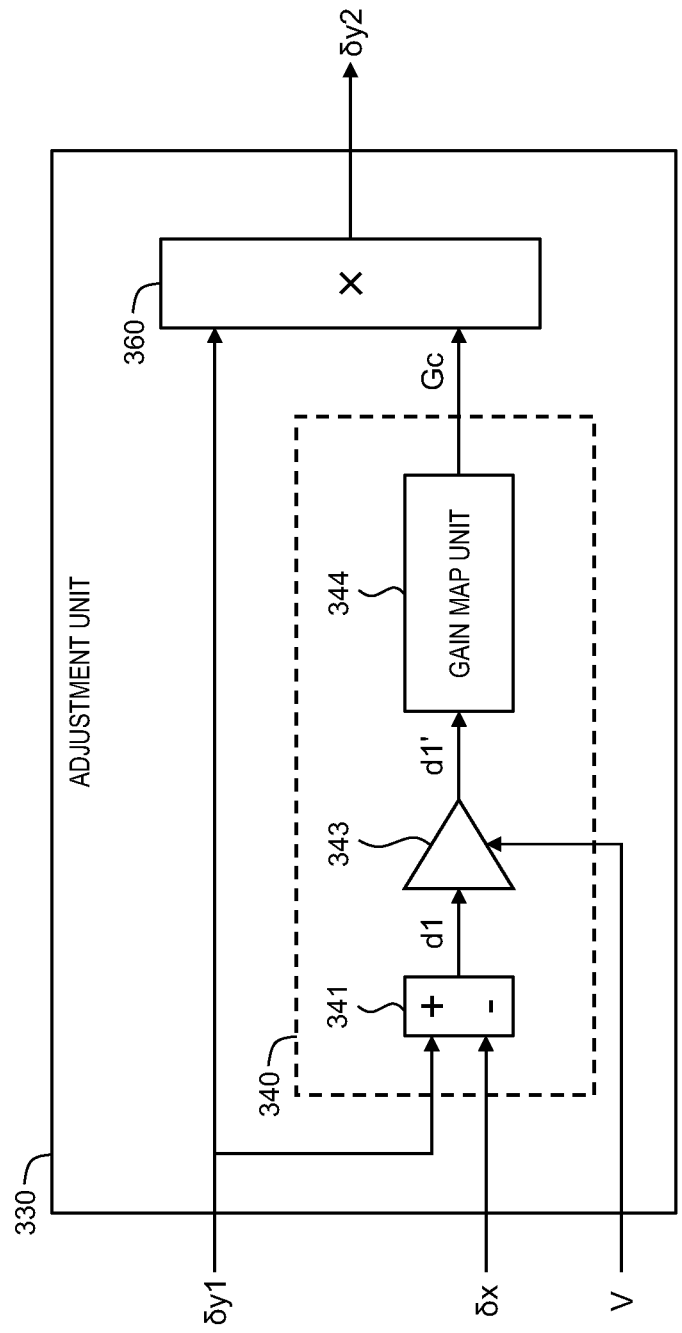
FIG. 10 is a block diagram showing a second configuration example of a gain setting unit according to an embodiment.

FIG. 10 is a block diagram showing a second configuration example of the gain setting unit 340. The gain setting unit 340 includes the difference calculation unit 341, a lateral G conversion unit 343, and a gain map unit 344. The difference calculation unit 341 is the same as in the case of the first configuration example.

The lateral G conversion unit 343 converts the first difference d1 between the first system turn angle δy1 and the driver turn angle δx into a dimension of the lateral acceleration, based on the vehicle speed V. The vehicle speed V is obtained from the vehicle state information. As a result of the conversion, a lateral acceleration deviation d1' corresponding to the first difference d1 is acquired.

The gain map unit 344 sets the conjunction reaction force gain Gc based on the lateral acceleration deviation d1' instead of the first difference d1. A policy of setting the conjunction reaction force gain Gc is the same as in the case of the gain map unit 342 in the above-described first configuration example. It should be noted that the gain map unit 344 is simplified as compared with the gain map unit 342 in the first configuration example, because the gain map unit 344 does not depend on the vehicle speed V.

5-2-3. Third Configuration Example

Figure 11:
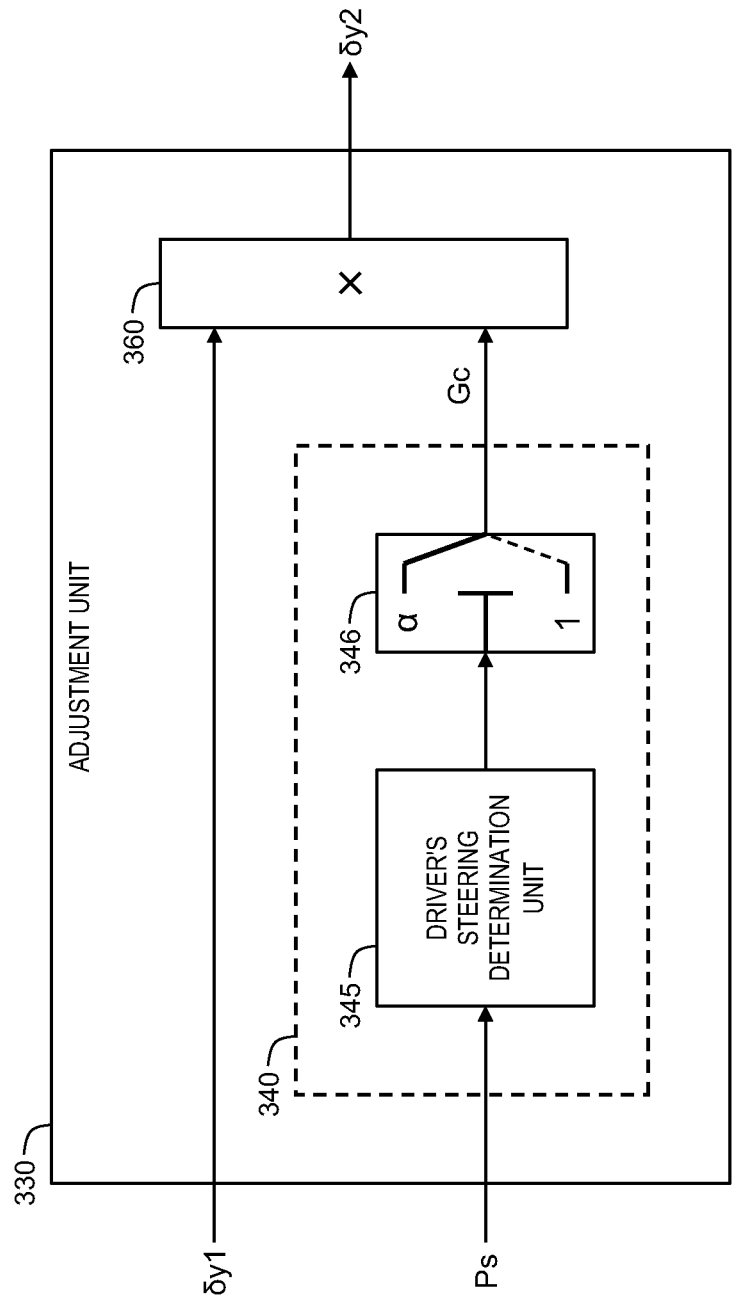
FIG. 11 is a block diagram showing a third configuration example of a gain setting unit according to an embodiment.

FIG. 11 is a block diagram showing a third configuration example of the gain setting unit 340. The gain setting unit 340 includes a driver's steering determination unit 345 and a gain switching unit 346.

The driver's steering determination unit 345 determines whether or not the driver has a steering intention. For that purpose, the driver's steering determination unit 345 determines whether or not the steering parameter Ps reflecting the driver's steering intention exceeds a threshold. For example, the steering parameter Ps is the steering torque Ts detected by the steering torque sensor 52. As another example, the steering parameter Ps may be the first difference d1 between the driver turn angle δx and the first system turn angle δy1. As still another example, the steering parameter Ps may be the lateral acceleration deviation d1' that is acquired by converting the first difference d1 into the dimension of the lateral acceleration. When the steering parameter Ps exceeds the threshold, the driver's steering determination unit 345 determines that the driver has a steering intention.

The gain switching unit 346 switches the conjunction reaction force gain Gc according to the result of determination by the driver's steering determination unit 345. More specifically, when it is determined that the driver has no steering intention, the gain switching unit 346 sets the conjunction reaction force gain Gc to "1." On the other hand, when it is determined that the driver has the steering intention, the gain switching unit 346 sets the conjunction reaction force gain Gc to a value α different from 1.

For example, the third configuration example is applied to a case where a steering direction by the driver and a turning direction by the driving assist control are in opposite phase. In the case of the opposite phase, the value α is less than 1. By using the conjunction reaction force gain Gc less than 1, the second difference d2 between the second system turn angle δy2 and the driver turn angle δx becomes smaller than the first difference d1 between the first system turn angle δy1 and the driver turn angle δx.

In a case where the steering direction by the driver and the turning direction by the driving assist control are in phase, the value α varies depending on a magnitude relationship between the driver turn angle δx and the first system turn angle δy1. When the driver turn angle δx is larger than the first system turn angle δy1, the value α is set to a value larger than 1. On the other hand, when the first system turn angle δy1 is larger than the driver turn angle δx, the value α is set to a value smaller than 1. As a result, the second difference d2 between the second system turn angle δy2 and the driver turn angle δx becomes smaller than the first difference d1 between the first system turn angle δy1 and the driver turn angle δx.

5-3. Modification Example

Figure 12:
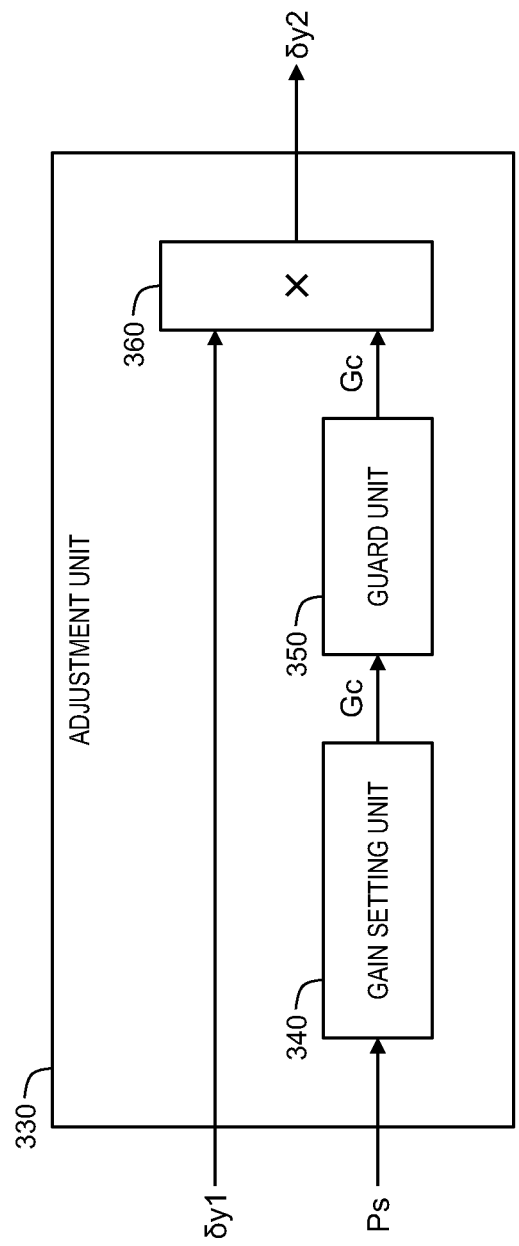
FIG. 12 is a block diagram showing a modification example of an adjustment unit of a conjunction reaction force control unit according to an embodiment.

FIG. 12 is a block diagram showing a modification example of the adjustment unit 330 of the conjunction reaction force control unit 310. As compared with the examples shown in FIGS. 8 to 11, the adjustment unit 330 further includes a guard unit 350. The guard unit 350 gradually changes the conjunction reaction force gain Gc in order to suppress a rapid change in the steering reaction force.

Figure 13:
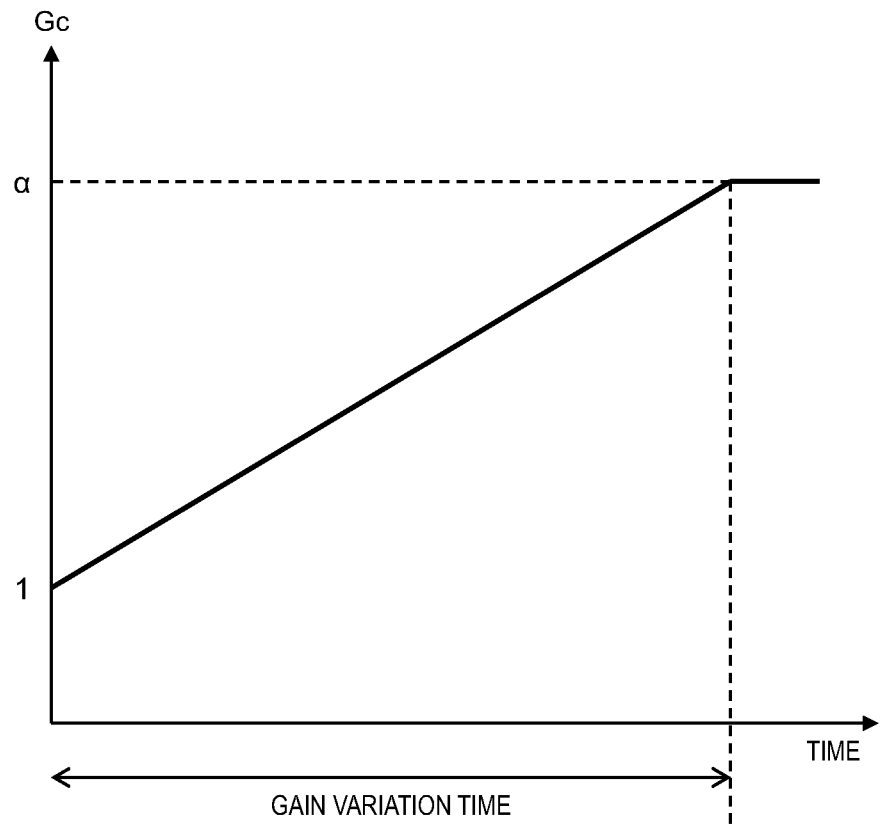
FIG. 13 is a diagram for explaining an example of a change in a conjunction reaction force gain in an embodiment.

FIG. 13 is a diagram for explaining an example of the change in the conjunction reaction force gain Gc. In the example shown in FIG. 13, the conjunction reaction force gain Gc gradually changes from "1" to "α." For example, a variation time of the conjunction reaction force gain Gc is set to half the "inverse number of a main frequency component of the first system turn angle δy1." Thus, a variation gradient of the second system turn angle δy2 becomes less than a variation gradient of the original first system turn angle δy1. As a result, a rapid change in the steering reaction force is suppressed.

5-4. Effects

As described above, according to the present embodiment, the conjunction reaction force control that applies the steering reaction force component to the steering wheel 3 in conjunction with the turning of the vehicle 1 caused by the driving assist control is performed. The steering reaction force component for the conjunction reaction force control is generated based on the difference between the driver turn angle δx and the system turn angle δy. At this time, the adjustment of the system turn angle δy is performed according to the steering intention of the driver. Then, the steering reaction force component for the conjunction reaction force control is generated by using the second system turn angle δy2 after the adjustment instead of the first system turn angle δy1 before the adjustment. The second difference d2 between the second system turn angle δy2 after the adjustment and the driver turn angle δx becomes smaller than the first difference d1 between the first system turn angle δy1 before the adjustment and the driver turn angle δx. Therefore, when the driver has the steering intention, the steering reaction force component for the conjunction reaction force control is suppressed. As a result, the driver's feeling of strangeness about the conjunction reaction force control is reduced.

It should be noted that the adjustment of the system turn angle δy is performed only in the conjunction reaction force control for applying the steering reaction force to the steering wheel 3. The turning control in the driving assist control is performed based on the original first system turn angle δy1. Therefore, in the driving assist control, the vehicle turning is achieved as intended. That is to say, performance of the driving assist control is never deteriorated.

Furthermore, according to the present embodiment, not the driver turn angle δx but the system turn angle δy is multiplied by the conjunction reaction force gain Gc. Therefore, the driver turn angle δx reflecting the driver's steering intention is not affected. Influence of the driver turn angle δx in the reaction force control is not reduced, and thus the reaction force control according to the driver's steering intention is achieved.

Moreover, the adjustment of the system turn angle δy is performed not in the driving assist control unit 400 but in the reaction force control unit 300 (i.e., the conjunction reaction force control unit 310). It is not necessary to transmit the steering parameter Ps reflecting the driver's steering intention to the driving assist control unit 400. Therefore, the amount of data communication between the ECUs is reduced.

What is claimed is:

1. A vehicle control system that controls a vehicle of a steer-by-wire type,
the vehicle control system comprising one or more processors configured to execute:
driving assist control that automatically controls turning of the vehicle independently of a driving operation by a driver of the vehicle; and
conjunction reaction force control that applies a steering reaction force component to a steering wheel in conjunction with the turning of the vehicle caused by the driving assist control, wherein
the conjunction reaction force control includes:
acquiring a driver turn angle that is a target turn angle corresponding to a steering angle of the steering wheel;
acquiring a first system turn angle that is a target turn angle required by the driving assist control;
an adjustment process that acquires a second system turn angle by adjusting the first system turn angle according to a steering intention of a driver of the vehicle; and
applying a steering reaction force component to the steering wheel in a direction of reducing a difference between the driver turn angle and the second system turn angle,
the adjustment process in the conjunction reaction force control acquires the second system turn angle by adjusting the first system turn angle such that the difference between the second system turn angle and the driver turn angle becomes smaller than a difference between the first system turn angle and the driver turn angle,
the driving assist control turns the vehicle based not on the second system turn angle but on the first system turn angle
the adjustment process includes:
a gain setting process that sets a conjunction reaction force gain according to the steering intention of the driver;
calculating the second system turn angle by multiplying the first system turn angle by the conjunction reaction force gain, and
the gain setting process sets the conjunction reaction force gain such that the difference between the second system turn angle and the driver turn angle becomes smaller than the difference between the first system turn angle and the driver turn angle,
the gain setting process sets the conjunction reaction force gain based on the difference between the driver turn angle and the first system turn angle,
when the driver turn angle is larger than the first system turn angle, the conjunction reaction force gain is set to a value larger than 1, and
when the first system turn angle is larger than the driver turn angle, the conjunction reaction force gain is set to a value smaller than 1.

2. The vehicle control system according to claim 1, wherein
the gain setting process includes:
converting the difference between the driver turn angle and the first system turn angle into a dimension of a lateral acceleration to acquire a lateral acceleration deviation; and
setting the conjunction reaction force gain based on the lateral acceleration deviation.

3. The vehicle control system according to claim 1, wherein
the gain setting process includes:
determining whether or not a steering parameter reflecting the steering intention of the driver exceeds a threshold; and
when the steering parameter exceeds the threshold, setting the conjunction reaction force gain to a value different from 1 such that the difference between the second system turn angle and the driver turn angle becomes smaller than the difference between the first system turn angle and the driver turn angle.

4. A vehicle control method that controls a vehicle of a steer-by-wire type,
the vehicle control method comprising:
driving assist control that automatically controls turning of the vehicle independently of a driving operation by a driver of the vehicle; and
conjunction reaction force control that applies a steering reaction force component to a steering wheel in conjunction with the turning of the vehicle caused by the driving assist control, wherein
the conjunction reaction force control includes:
acquiring a driver turn angle that is a target turn angle corresponding to a steering angle of the steering wheel;

acquiring a first system turn angle that is a target turn angle required by the driving assist control;

an adjustment process that acquires a second system turn angle by adjusting the first system turn angle according to a steering intention of a driver of the vehicle; and applying a steering reaction force component to the steering wheel in a direction of reducing a difference between the driver turn angle and the second system turn angle, the adjustment process in the conjunction reaction force control acquires the second system turn angle by adjusting the first system turn angle such that the difference between the second system turn angle and the driver turn angle becomes smaller than a difference between the first system turn angle and the driver turn angle, the driving assist control turns the vehicle based not on the second system turn angle but on the first system turn angle the adjustment process includes:
- a gain setting process that sets a conjunction reaction force gain according to the steering intention of the driver;
- calculating the second system turn angle by multiplying the first system turn angle by the conjunction reaction force gain, and
- the gain setting process sets the conjunction reaction force gain such that the difference between the second system turn angle and the driver turn angle becomes smaller than the difference between the first system turn angle and the driver turn angle,
- the gain setting process sets the conjunction reaction force gain based on the difference between the driver turn angle and the first system turn angle,
- when the driver turn angle is larger than the first system turn angle, the conjunction reaction force gain is set to a value larger than 1, and
- when the first system turn angle is larger than the driver turn angle, the conjunction reaction force gain is set to a value smaller than 1.

5. The vehicle control system according to claim 1, wherein
the conjunction reaction force control further includes:
acquiring a steering parameter reflecting the steering intention of the driver of the vehicle, and
performing the adjustment process according to the steering parameter.

6. The vehicle control system according to claim 5, wherein
the steering parameter is one of the driver turn angle, the difference between the driver turn angle and the first system turn angle, and a steering torque detected by a steering torque sensor.

* * * * *